United States Patent [19]
Pirkle

[11] Patent Number: 4,460,007
[45] Date of Patent: Jul. 17, 1984

[54] VALVE MECHANISM

[76] Inventor: Fred L. Pirkle, Controls Consulting Company, R.D. 2, Box 353, Phoenixville, Pa. 19460

[21] Appl. No.: 460,927

[22] Filed: Jan. 25, 1983

[51] Int. Cl.³ .......................... E03B 7/10; F16K 17/38
[52] U.S. Cl. ........................................ 137/79; 137/62; 251/11; 251/62; 251/67; 251/74; 251/297; 236/48 R
[58] Field of Search ........................ 137/59, 61, 62, 79, 137/80, 468; 236/42, 43, 48 R, 90; 237/80; 251/11, 66, 67, 74, 75, 297, 77, 335 A

[56] References Cited
U.S. PATENT DOCUMENTS

| | | | |
|---|---|---|---|
| 1,468,068 | 9/1923 | Hanson | 137/62 |
| 1,526,718 | 2/1925 | Opp | 137/13 |
| 2,547,853 | 4/1951 | Butterfield | 251/66 |
| 2,688,460 | 9/1954 | Borgerd | 251/68 |
| 2,716,418 | 8/1955 | Borgerd | 137/61 |
| 2,822,693 | 2/1958 | Mulsow | 137/62 |
| 3,040,772 | 6/1962 | Todd | 137/509 |
| 3,385,559 | 5/1968 | Churchill | 251/74 |
| 4,026,465 | 5/1977 | Kenny | 236/48 R |
| 4,066,091 | 6/1978 | Itoh et al. | 137/79 |
| 4,173,986 | 11/1979 | Martin | 137/613 |
| 4,361,167 | 11/1982 | Harasewych | 137/62 |
| 4,398,553 | 8/1983 | Perrine | 251/74 |

FOREIGN PATENT DOCUMENTS 179481 11/1982 Japan ..................... 137/79
642518 9/1950 United Kingdom ............... 137/468

OTHER PUBLICATIONS

Ogontz Industrial Division Bulletin F-200, Ogontz Controls Co.

Primary Examiner—A. Michael Chambers
Attorney, Agent, or Firm—Howson and Howson

[57] ABSTRACT

In a freeze protection valve, a wax actuator is situated in a heat-conductive housing to which heat is conducted from the liquid system being protected. The housing prevents the actuator from triggering the valve to its opened condition while the liquid system is hot, but permits a rapid response when the liquid system is cool. In a snap-action freeze protection valve, the actuator is carried by the valve stem, and heat is conducted from the valve body to the valve stem through a sleeve through which the valve stem slides. The actuator moves a cam within the valve stem which operates a ball-type latch. The latch holds the valve in the closed position until the actuator releases the latch.

Also disclosed is a remote-controlled valve operating mechanism which uses an electrically heated wax actuator to effect valve closure. A cam and ball mechanism relieves the force on the actuator piston as soon as valve closure takes place, thereby preventing failure of the actuator due to prolonged application of high pressures and temperatures.

29 Claims, 3 Drawing Figures

VALVE MECHANISM

BRIEF SUMMARY OF THE INVENTION

This invention relates to valves and more particularly to a novel freeze protection valve and to a valve mechanism useful in protecting liquid systems against damage due to freezing and in various other applications.

A typical use for a freeze protection valve is in protecting the cooling water system of a railroad locomotive against damage from freezing temperatures. It is common practice to provide railroad locomotive cooling water systems with one or more temperature-responsive valves which open when the ambient temperature becomes low enough to threaten damage due to freezing of the cooling water. These valves open automatically as the temperature approaches freezing, and drain water from the cooling system. Since railroad locomotives are typically in continuous operation over long periods of time, it is practical to use these valves for freeze protection instead of providing antifreeze compounds in the cooling system.

The use of freeze protection valves is not limited to railroad locomotives. They have numerous other uses, such as in chemical manufacturing plants, heating systems for buildings, and shipboard and land-based power plants and fire protection systems.

Many modern freeze protection valves make use of wax-filled thermal actuators. A wax-filled thermal actuator, or "wax actuator" comprises an actuator body filled with a hydrocarbon wax specially formulated to change from solid to liquid or from liquid to solid gradually over a predetermined temperature range. As the wax changes from solid to liquid, its volume increases. The increase in volume produces movement of an actuator piston which extends outwardly from the actuator body. Motion is transmitted from the wax to the piston through a rubber plug situated in the neck of the actuator body. The diameter of the barrel of the neck in which the rubber plug is situated is larger at the end nearest the wax than at the end nearest the actuator piston. In operation, as temperature increases, the wax melts, and the piston is extended. When temperature is reduced, the wax resolidifies and contracts in volume, and the piston can be pushed back into the actuator by an external spring.

Valves using wax actuators are of two general types. The first type is the modulating type. The modulating type valve is one in which the extent to which the valve is opened is directly related to the position of the actuator piston relative to the actuator body. This type of valve has found extensive use in freeze protection despite one significant deficiency. That deficiency results from the fact that the actuator piston movement is continuous over a considerable temperature range with the result that a valve designed to be fully open at a particular temperature begins to open at a significantly higher temperature. If the chosen temperature range is on the high side, the valve may open unnecessarily. On the other hand, if a lower temperature range is chosen in order to avoid unnecessary valve opening, freezing of the liquid system may occur before the valve has had a chance to drain the entire system.

This deficiency of the modulating-type valve has led to the use of snap-acting freeze protection valves in which the operation of a wax actuator triggers a spring-loaded valve element, causing it to move instantaneously from a fully closed condition to a fully opened condition at an accurately predetermined temperature. Currently available snap-acting valves, however, have their own deficiencies. In some of these valves the actuator is in contact with, and responsive to the temperature of, the liquid within the valve body. In other snap-action valves, the actuator body is in contact with, and responsive to the temperature of, the ambient atmosphere.

The first type of snap-action valve, in which the actuator is responsive to the temperature of the liquid within the valve body, has been satisfactory in many applications. However, under some conditions it may allow a remote part of the liquid system to freeze before the actuator causes the valve to snap open. This occurs when the temperature conditions and system configuration are such that the mass of water in the vicinity of the freeze protection valve does not lose heat as fast as water in a remote part of the system. Freezing of water in a remote part of the system can cause blockage of flow so that, even after the valve eventually opens, only a part of the liquid in the system is drained.

In the second type of snap-action valve, in which the actuator body is responsive to the ambient atmosphere, the actuator can cause the valve to open and drain the system when the atmosphere is cold, even though the water system is warm. This effect is known as "nuisance dumping", and is quite common.

It is an object of this invention to avoid the problems discussed above, which are inherent in previously available modulating and snap-action freeze protection valves.

In accordance with the invention, the body of an actuator, which serves as its temperature sensor, is situated at a location such that it is out of contact with the liquid in the valve chamber and in the liquid system. At least a substantial part of the sensing element is surrounded by a heat-conductive housing, and means are provided for conducting heat from the liquid system to the heat-conductive housing. So long as the liquid system is warm, the housing surrounding the sensor reduces the effect, on the sensor, of changes in ambient temperature. However, if the liquid system cools, the heat-conductive housing loses heat rapidly, and allows the sensor to respond rapidly to a drop in the ambient temperature. Thus, a freeze protection valve constructed in accordance with the invention avoids "nuisance dumping", yet responds rapidly whenever conditions are such as to threaten freezing of any part of the liquid system to which the valve is connected.

In the preferred embodiment of the invention, the actuator body is connected to and carried by the valve stem, and heat from the liquid in the valve body is conducted to the heat-conductive housing surrounding the actuator body through the valve stem. A latch, which holds the valve element closed under normal conditions, comprises balls held against axial movement in radial passages in the valve stem and a cam, operated by the actuator, causing the balls to project outwardly underneath a latching step in a sleeve through which the valve stem slides. The actuator, and the latch mechanism are thus both carried by the valve stem. When the actuator piston retracts in response to a cooling of the ambient air, the cam moves allowing the balls to move inwardly, clearing the latching step and allowing the valve stem to move upwardly, opening the valve element. Resetting of the valve is accomplished simply by heating the actuator, if necessary, and pressing manually on the end of the valve stem, as will appear from the detailed description which follows.

The ball-type latch mechanism carried by the valve stem is extremely simple in structure and operation, and lends itself to use in snap-acting valves having other types of actuators, including solenoid actuators, and temperature or pressure-responsive bellows actuators.

Because the temperature sensor is carried by the valve stem, a conventional freeze protection valve of the modulating type can be readily converted to a snap-action valve simply by replacing the valve stem assembly.

A related device takes advantage of a wax actuator in resetting a snap-acting valve by remote control. In this device, the actuator body is fixed to the valve body, and the valve stem includes a ball cage, the balls being arranged to move radially outwardly and engage a latching step on a neck assembly fixed to the valve body. Within the valve stem, a cam is urged by a spring against the actuator piston and controls movement of the latching balls.

Provision is made for applying heat to the actuator electrically by remote control. Opening of the valve is effected automatically as the actuator piston retracts under cold ambient conditions. Resetting is accomplished by applying heat through the electrical heater. This causes the actuator piston to extend, pushing the valve closed. When the valve reaches its closed condition, the latching balls are moved outwardly by the cam, and hold the valve element closed. In this device, the actuator itself serves as a "motor" to effect resetting. A wax actuator is capable of exerting a large force, and therefore will easily effect valve closure when it is heated by remote control. However, the actuator cannot be used reliably to hold the valve closed because, under prolonged application of high temperature and pressure, the rubber plug in the neck of the actuator body tends to adhere to the neck, causing failure of the actuator. In accordance with the invention, as soon as the valve is reset, the valve element is held closed by the ball latch, and the only pressure exerted against the actuator piston is a relatively small pressure exerted by a spring which holds the latching cam against the actuator piston.

This remote-resetting valve may have also have the feature that its actuator is at least partially surrounded by a heat-conductive housing to which heat is conducted from the system liquid. Thus, the device is usable as a rapid-response freeze protection valve which avoids the problem of nuisance dumping.

The remote-resetting feature makes the valve usable as a block valve in an instrument manifold, and in many other applications where remote control is desirable.

The mechanical structure of the remote-resetting valve is also advantageous for use with actuators other than the wax actuator, such as solenoids, and temperature or pressure-responsive bellows actuators.

It is therefore another oject of this invention to provide a structurally simple and effective remote-controlled valve resetting mechanism, and to take advantage of the characteristics of a wax actuator in a remote-controlled valve resetting mechanism.

Various other objects and advantages of the invention will be apparent from the following detailed description.

DETAILED DESCRIPTION

Figure 1:
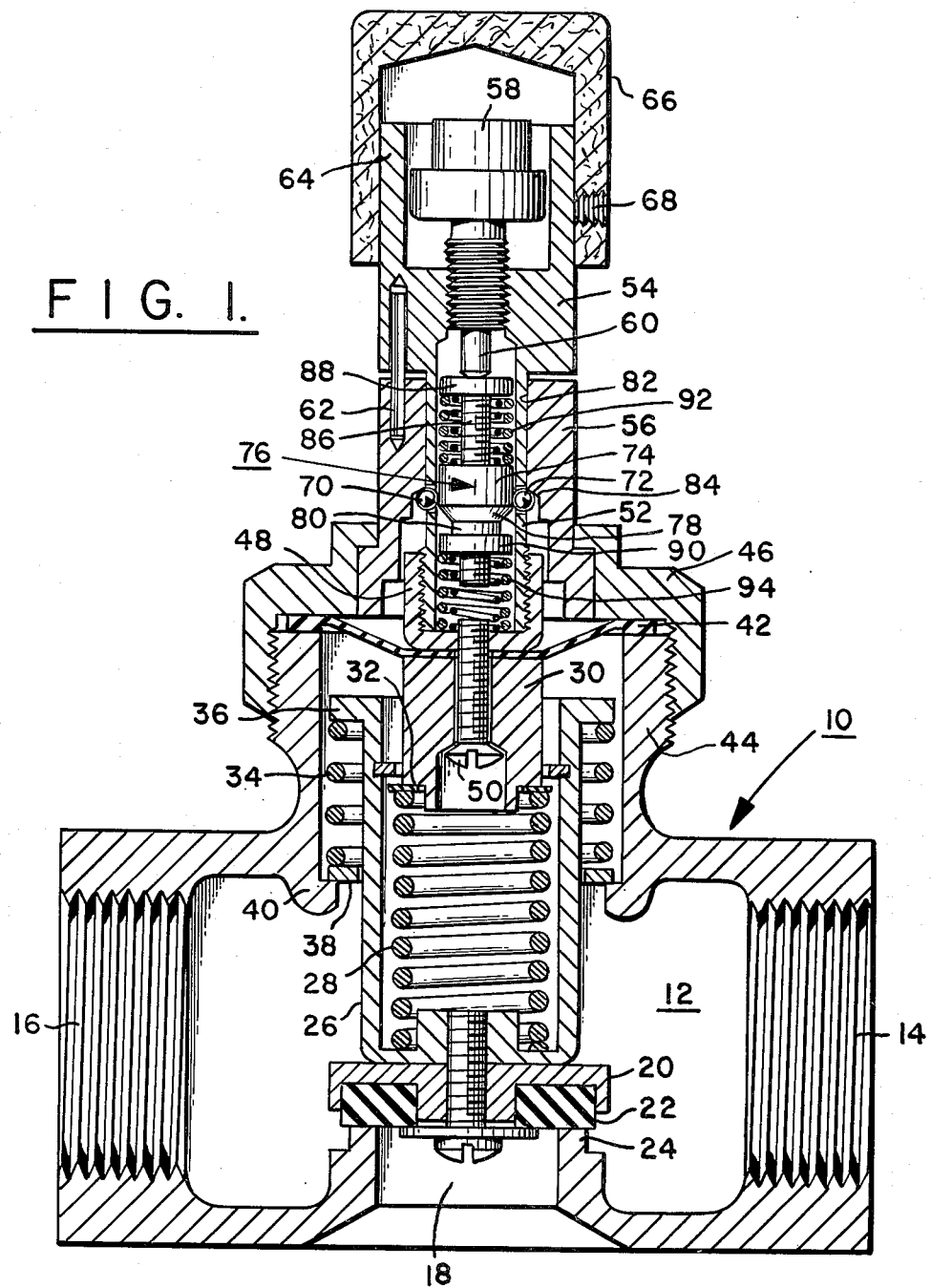
FIG. 1 is a vertical section through a wax-actuator controlled, snap-action freeze protection valve in accordance with the invention, showing the valve latched in its closed condition, and also showing the actuator housing with an insulating closure.

FIG. 1 shows a valve body 10 having a valve chamber 12 with ports 14 and 16 connectable to a liquid system such as the cooling water system of a railroad locomotive. The valve body also has a drain port 18 which is closed by a valve element 20 having an elastomeric valve plug 22 held against valve seat 24.

The valve element is secured by a screw to a cage 26 which houses a spring 28. Valve stem element 30 bears downwardly against a ring 32, and spring 28 is in compression between ring 32 and the bottom of cage 26. A spring 34 is held between flange 36 of cage 26 and ring 38 on shoulder 40 of the valve body.

As thus far described, the valve mechanism is similar to that of a conventional modulating freeze protection valve. Spring 28 corresponds to the overtemperature spring, which, in the modulating valve, allows the actuator to expand under high temperature conditions. In the valve of FIG. 1, which is a snap-acting valve, spring 28 serves merely to insure that the valve element is held closed against its seat. This spring is unnecessary if the valve mechanism is properly adjusted.

Spring 34 is the operating spring of the valve, urging the valve element toward its open condition. Spring 34 opens the valve when the latch is released.

Spring 28 must be stronger than spring 34, and spring 28 must be such that in its relaxed condition it is only slightly longer than as shown in FIG. 1.

A synthetic rubber diaphragm 42 is clamped onto the upper end of neck 44 of the valve body by a cap 46. This diaphragm prevents liquid within the valve body from flowing upwardly into the valve latch mechanism. The central portion of the diaphragm is clamped between element 30 and stem cap 48 at the bottom of the latch mechanism. A screw 50 extends upwardly through element 30 and the central portion of diaphragm 42, and is threaded into cap 48.

Cage 52 is a cylindrical extension of actuator carrier 54. The cage extends from actuator carrier 54 downwardly into sleeve 56, which is press fit into cap 46. The body of a wax actuator 58 is threaded into actuator carrier 54, and the piston 60 of the actuator extends downwardly from the actuator body into the interior of cage 52. If desired, the actuator can be locked in its carrier by a set screw (not shown). The actuator carrier is prevented from rotating with respect to sleeve 56 by a sheet metal spring pin 62 which is fixed to sleeve 56 and extends upwardly into a hole in carrier 54.

Actuator carrier 54 has a cylindrical wall 64 which extends upwardly and surround a substantial part of the actuator body, which constitutes the temperature sensing element of the actuator. Wall 64 serves as a heat-conducting housing. Heat from the liquid in the valve body is conducted through neck 44, cap 46 and sleeve 56 to cage 52. The cage and the inner wall of sleeve 56 should be in close engagement with each other over a significant area, at least when the valve is latched closed, in order to provide for good conduction of heat from the sleeve to the cage. Heat is conducted from the cage upwardly to the actuator carrier 54 and to wall 64 which surrounds the actuator.

An insulating closure 66, in the form of a cap is placed over the top of the actuator carrier, and is secured in place by a set screw 68. This closure may take various forms. In FIG. 1, the closure consists of insulating material which controls the rate of heat loss from the actuator housing. The rate of heat loss can be adjusted by using closures of different thicknesses, materials, shapes or sizes.

Metal balls 70 and 72 are two of a series of balls arranged in a ring. Each ball is held in its own radial opening in the wall of cylindrical cage 52 against axial movement with respect to the cage. The balls are prevented from inward movement by the cylindrical outer surface 74 of a cam 76. Cam 76 also has a frusto-conical downwardly facing surface 78 which meets a smaller cylindrical surface 80 of the cam to provide a space into which the balls can move when cam 76 moves upwardly.

Inner surface 82 of sleeve 56 has a downwardly facing, frusto-conical latch step 84 which is preferably disposed at an angle of approximately 15° with respect to horizontal (i.e. 75° with respect to the axis of cylindrical cage 52). In FIG. 1, balls 70 are held by cylindrical surface 74 of cam 76 so that they project outwardly from the cage and engage latching step 84, thereby holding the cage in its latched position. The cage, in turn, operating through cap 48, element 30 and spring 28, holds plug 22 of valve element 20 against seat 24, closing off drain port 18.

The relative strengths of springs 28 and 34 are such that spring 34 will not cause cage 26 to move upwardly against spring 28 when the valve stem is latched down by the engagement of the balls with the latching step. However, when the latching mechanism is released, spring 28 expands to a condition such as to allow operating spring 34 to raise the valve element and open the drain port.

A threaded stem 86 extends inside cage 52 along the axis of the cage. It has a head 88 engaged by actuator piston 60. A flange 90 threaded onto stem 86 supports cam 76. However the cam is provided with a central opening which clears the threads of stem 86 so that the stem can move downwardly while the cam remains stationary.

A pair of coaxial coil springs, the outer one of which is indicated at 92, are in compression between head 88 and the top of cam 76. A similar pair of springs, the outer one of which is indicated at 94, are in compression between flange 90 and the horizontal bottom of cap 48.

In operation of the device, assuming that the valve is closed and the latch is set as shown in FIG. 1, so long as water within the valve body is warm, heat is conducted to the actuator housing. This heat prevents the actuator from being cooled by low ambient temperatures in the surrounding atmosphere to such an extent as to trigger the valve to its opened condition. However, when the water in the liquid system cools, the actuator housing loses heat, and no longer protects the actuator from low ambient temperatures. The actuator housing, because of its relatively low mass, loses heat rapidly when the liquid in the liquid system cools. Therefore, there is no significant delay between the time the liquid system cools and the time at which the actuator is first enabled to respond to low ambient temperatures.

Assuming the liquid in the liquid system is cool, a low ambient temperature (in the range for which the actuator was designed) will cause the actuator's piston 60 to retract. Spring 94 will then push upwardly on flange 90, which in turn pushes upwardly on threaded stem 86 as well as cam 76. When the cam moves upwardly a sufficient distance, the latching balls are allowed to move inwardly, and are caused to move inwardly by reason of the slope of conical step 84 and the action of valve operating spring 34. As soon as the balls clear the step, the entire valve stem assembly snaps upwardly under the action of spring 34, and the valve opens to drain the liquid system.

Figure 2:
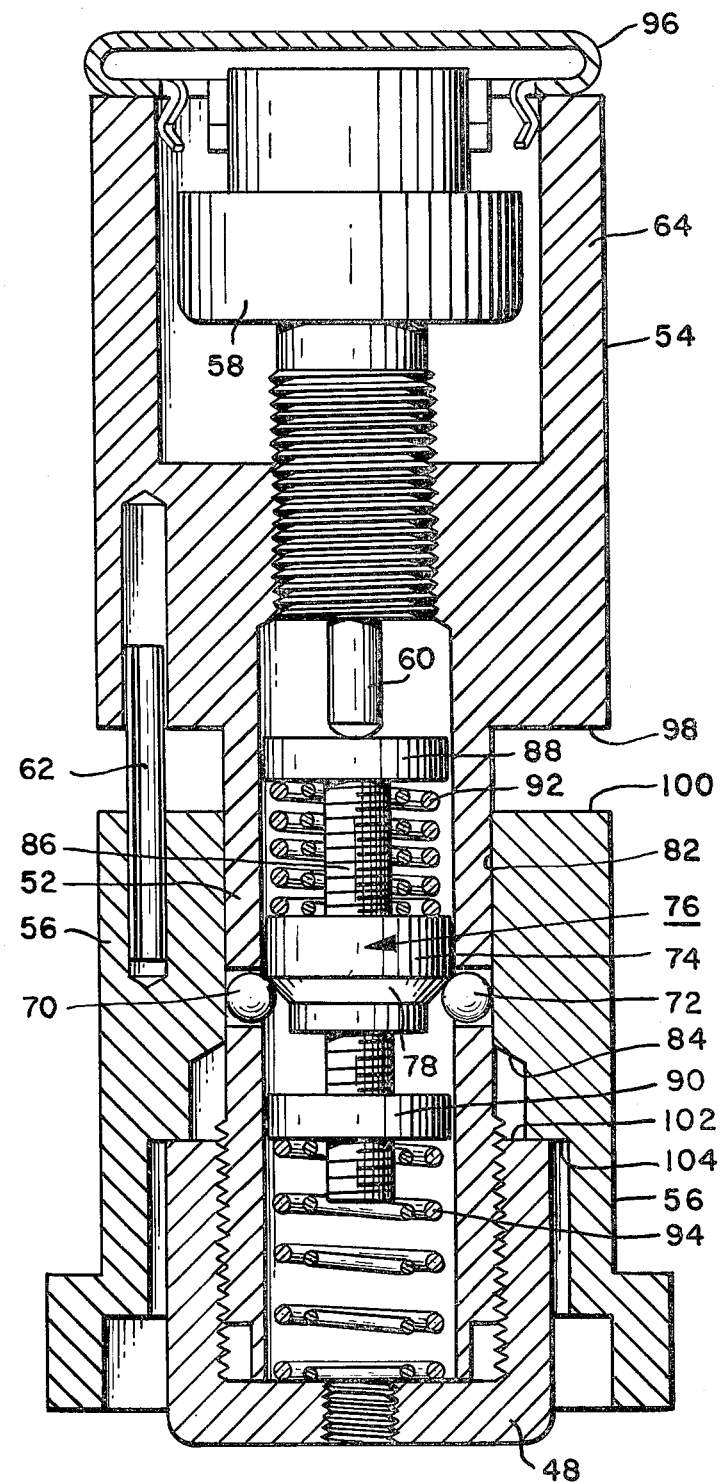
FIG. 2 is a vertical section showing the valve-operating mechanism of FIG. 1 in its unlatched condition, and also showing an alternative form of closure on the actuator housing.

When the valve is open, cage 52 moves to the condition illustrated in FIG. 2, in which the balls are in engagement with inner surface 82 of sleeve 56, and located some distance above latching step 84.

If, while the valve is in its open condition, heat is applied to the actuator, its piston 60 will move downwardly. Heat may be applied to the actuator, for example, to prepare it for resetting. To prevent the actuator from being damaged when heat is applied, provision is made for downward movement of threaded stem 86 while cam 76 is locked in position by the latching balls as shown in FIG. 2. Piston 60 of the actuator presses down on head 88 of threaded stem 86, and the threaded stem moves downwardly against springs 92 and 94 and their smaller internal springs. With the mechanism in the position shown in FIG. 2, shoulder 98 of actuator carrier 54 is separated from shoulder 100 of sleeve 56, while shoulder 102 of cap 48 bears against shoulder 104 of sleeve 56 to limit upwardly movement of the movable assembly.

In resetting, the heat is first applied to the actuator housing, and then the actuator housing is simply depressed manually until the balls clear latching step 84. As soon as this occurs, conical surface 78 of cam 76, which is disposed at a steeper angle than surface 84 (e.g. 45°) causes the balls to move outwardly underneath latching step 84. When the balls clear cylindrical surface 74 of the cam, the cam is moved downwardly by spring 92 and the smaller internal spring, into engagement with flange 90, whereupon the balls can no longer move inwardly, and the valve is latched closed with all parts in the condition illustrated in FIG. 1.

If, in resetting, the ball detents do not project outwardly underneath latching step 84 to the fullest possible extent, latching will take place, but the valve may not be tightly closed. Heat conducted to the actuator housing from the liquid system will eventually cause the actuator piston to extend further downwardly causing cam 76 to drive the ball detents outwardly so that the device automatically assumes its fully latched condition. This is made possible by the fact that cam surface 78 is steeper than latching surface 84, so that the cam can drive the balls outwardly against the latching surface, tightening the valve.

The apparatus of FIG. 2 can easily be installed in a wide variety of conventional valves with minimal modifications to the valves. Therefore, the latching mechanism may be used advantageously with various alternative forms of actuators, including electrically operated solenoids, and pressure or temperature-operated bellows.

FIG. 2 shows an alternative form of protective closure 96. Closure 96 is a heat-conductive metal closure which snaps into the open upper end of wall 64 and serves as part of the actuator housing. A closure such as closure 96 may be used where it is unnecessary to use an insulated cap to reduce the rate of heat loss from the actuator housing. In some applications it may be unnecessary to use a closure of any kind.

The mechanism of FIG. 2 can be used to cause a valve to snap closed in response to operation of an actuator. This may be easily accomplished, for example, by redesigning the valve body so that the valve element moves upwardly against a seat rather than downwardly.

It will also be apparent that the latching mechanism may be redesigned to provide for snap-action opening or closing movement of a valve open extension of an actuator piston rather than upon retraction thereof. This may be accomplished by a modified design in which the direction of the cam is reversed so that the latching balls are permitted to move inwardly as the cam descends upon extension of the actuator piston.

Numerous other modifications in the details and configuration of parts may of course be made without departing from the scope of the invention as defined in the claims.

Figure 3:
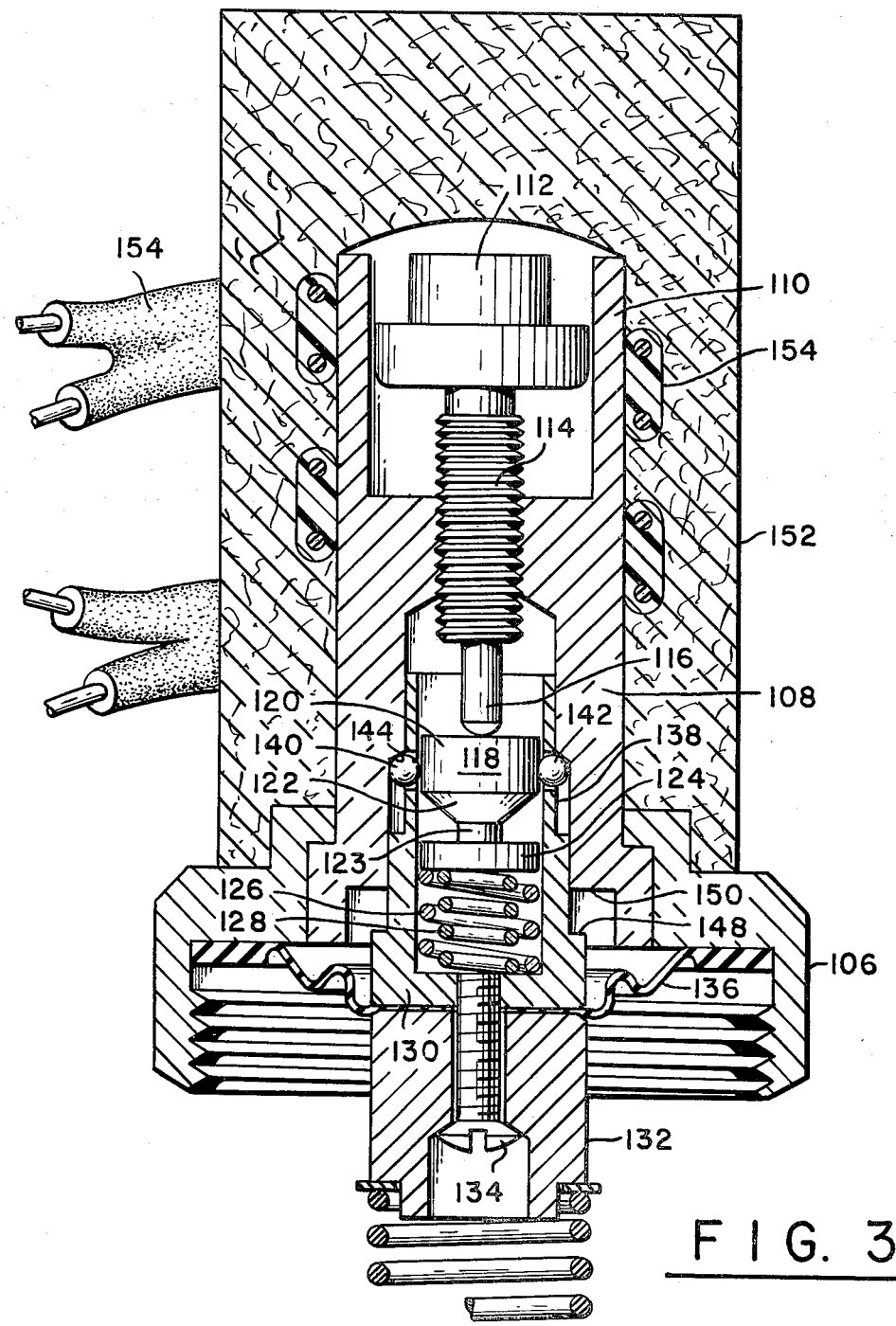
FIG. 3 is a vertical section through a remote-controlled valve resetting mechanism in accordance with the invention.

Referring now to FIG. 3, a remote-controlled valve resetting mechanism is shown comprising a cap 106, which corresponds to cap 46 in FIG. 1, and which is designed to be threaded onto the threaded neck of a conventional valve body such as the valve body shown in FIG. 1. A neck 108 is press fit into the cap, and extends upwardly therefrom. This neck includes an actuator housing 110 which encloses a substantial part of a wax actuator 112. The threaded stem 114 of the actuator is threaded into the neck itself. Therefore, the body of the actuator is fixed with respect to the valve body, unlike the actuator in FIGS. 1 and 2, which is movable with the valve stem.

Actuator piston 116 bears against the top of a cam 118. The cam has a cylindrical surface 120, a downwardly facing frusto-conical surface 122 terminating in a smaller-diameter cylindrical surface 123, and a disc 124 having a diameter approximately equal to that of cylindrical surface 120. All of the elements of the cam are fixed together, and the cam is urged upwardly against actuator piston 116 by coil springs 126 and 128. The cam and the springs are located in a cage 130 to which is secured a stem element 132 by means of a screw 134. A diaphragm 136 is clamped between the bottom of cage 130 and the top of stem element 132, and its periphery is designed to be clamped between cap 106 and the neck of a valve body.

Cage 130 is movable vertically with respect to neck 108 in a cavity in the neck. An upwardly extending cylindrical part 138 of the neck holds a ring of latching balls including balls 140 and 142 in a series of radial holes.

As shown in FIG. 3, the balls are held outwardly underneath a downwardly facing frusto-conical latching step 144 in neck 108 by cylindrical surface 120 of cam 118.

The neck is surrounded by insulation 152, and heat trace wire 154 is wound about neck 108 so that the neck may be heated electrically by remote control.

When the mechanism of FIG. 3 is used to control a freeze protection valve, it operates in a manner similar to the device of FIGS. 1 and 2 in that heat conducted from the valve body to the actuator housing prevents the actuator from responding to cold ambient temperatures until the water in the system cools. The amount of insulation surrounding the neck of the device can be adjusted to control the rate of heat loss from the neck so that the actuator is enabled to respond promptly to drops in ambient temperature as soon as the water system cools.

The device of FIG. 3 is designed to be attached to a valve body similar to the valve body shown in FIG. 1. The latch mechanism is shown in its latched condition, i.e. the condition which it would be in if the valve of FIG. 1 were closed.

Assuming that the liquid system is cool and that electrical heat is not applied to the neck, a reduction in ambient temperature will cause piston 116 of the actuator to retract, allowing springs 126 and 128 to move cam 118 upwardly. When the cam moves upwardly a sufficient distance, the latching balls are moved inwardly by the action of frusto-conical step 144 and the valve operating spring (not shown in FIG. 3). When the balls clear the latching step, the valve element is under the control of the valve operating spring and actuator piston 116. As actuator piston 116 retracts further, the valve opens to drain the liquid system.

When current is applied to the heat trace wire, heat is conducted to the actuator housing and to the actuator body itself. This causes the actuator piston to extend downwardly. The balls are held underneath cam 118 by the narrow cylindrical wall of the upper part of the neck cavity. Therefore, extension of actuator piston 116 causes cage 130 to move downwardly, causing the valve element to move in the closing direction. The parts should be adjusted so that the valve closes just as the balls move outwardly underneath latching step 144.

As actuator piston 116 continues to moves downwardly, cam surface 122 clears the balls, and the valve is held closed entirely by the engagement of the balls with the latching step. The force of the valve operating spring against the actuator piston is relieved, and the actuator piston now operates only against the force of springs 126 and 128. Current in the heat trace wire can be turned off as soon as the valve closes, assuming that heat is available either from the ambient atmosphere or from the liquid system itself to maintain the actuator piston in its extended condition.

The apparatus of FIG. 3 takes advantage of the ability of a wax actuator to exert a very large force over a comparatively short time interval. Because of the large force applied by the wax actuator, this remote-controlled valve mechanism can be used to close a valve element against very high pressures, and is therefore applicable to various high pressure steam and pneumatic systems. The latching mechanism relieves the force on the actuator piston as soon as latching takes place. Therefore, the full actuator force is applied only over comparatively short intervals. This avoids actuator failure due to continuous simultaneous application of high pressure and temperature. The actuator will withstand high temperatures for a long period of time so long as high pressure is not applied at the same time.

The mechanism of FIG. 3, of course, can be modified for use in various kinds of valves, including remote-controlled block valves in instrument manifolds. The latching mechanism is applicable to solenoid actuators and bellows actuators as well as to wax actuators. In the case of a solenoid actuator, a relatively large electrical current can be used to effect initial closure of the valve, and can be reduced as soon as latching takes place to a current level just sufficient to hold cam 118 against the force exerted by springs 126 and 128.

Various other modifications to the apparatus of FIG. 3 can be made without departing from the scope of the invention.

I claim:

1. A valve for use in draining a railroad locomotive cooling water system to prevent the system from freezing under low ambient temperature conditions comprising:

means providing a valve chamber connectable to the system, said valve chamber having a drain outlet;

a valve element cooperating with said drain outlet and movable from a first position in which it closes the drain outlet to a second position in which the drain outlet is opened;

means connected to the valve element for urging the valve element toward its second position;

latch means connected to the valve element for holding the valve element in its first position and releasable to permit the valve element to move to its second position under the influence of the urging means;

a valve stem connected to the valve element and movable therewith as the valve element moves from its first position to its second position;

a temperature sensor connected to the valve stem and movable therewith, the sensor including a temperature sensing element at a location such that it is out of contact with the water in the valve chamber, and out of contact with the water in the system when the valve is connected to said system, and means responsive to the temperature sensing element for releasing the latch means when the temperature of the sensing element falls below a predetermined level;

means providing a heat-conductive housing, also carried by the valve stem and movable therewith surrounding at least a substantial part of the temperature sensing element and partly isolating the temperature sensing element from the ambient atmosphere; and means for conducting heat from the system through the valve stem to the heat-conductive housing when the valve chamber is connected to the system at a rate such that the valve is prevented from opening in response to low ambient temperatures while the water in the system is warm, yet responds rapidly to a drop in the ambient temperature when the water in the system is cool.

2. A valve according to claim 1 including means attached to said heat-conductive housing for controlling the rate of heat loss from said housing.

3. A valve according to claim 1 in which said means providing a heat-conductive housing isolates the temperature sensing element from the ambient atmosphere substantially completely.

4. A valve mechanism comprising:

a valve body with at least two ports and a movable closure element arranged to control flow of a fluid from one of said ports to another of said ports, said closure element being movable along an axis between a first valve position in which flow from one of said ports to the other is shut off and a second valve position in which flow from one of said ports to the other is permitted;

an actuator comprising an actuator body and an actuator element movable in relation to said actuator body;

means, secured to the valve body, providing a latching surface;

stem means slidable along said axis, the stem means being connected to the actuator body and to the closure element whereby the actuator body moves with the closure element;

latch means, carried by the stem means and engageable with the latching surface-providing means, for holding the valve element in one of said valve positions; and means for urging the stem means in a direction to move the valve element toward the other of said valve positions;

said latch means being engaged with the movable actuator element and being responsive to a predetermined movement thereof in relation to the actuator body for disengagement with the latching surface, whereby said urging means can operate to move the valve element toward said other of said valve positions, and including:

sleeve means secured to the valve body, said sleeve means having an internal passage extending along said axis, and said passage having an internal surface;

and in which:

the actuator element is movable in relation to the actuator body along said axis;

the stem means extends through the sleeve means; and the latch means cmprises: an axial passage in the stem means, detent means carried by the stem means and held thereby against axial movement with respect to the stem means, and cam means, movable axially within the axial passage of the stem means, for urging the detent means outwardly so that it protrudes to a position in which it is capable of engaging the latching surface, the cam means being movable from a first cam position in which the detent means protrudes to a second position in which the detent means can retract, and having a camming surface for urging the detent means in its protruding direction;

the means providing a latching surface being a step on the internal surface of the sleeve, said step being cooperable with the detent means to prevent movement of the stem means by the urging means in said direction along said axis, said step being of a shape such that movement of the stem means in said one direction causes the detent means to move inwardly when inward movement is permitted by said cam means; and means connected to said actuator element and said cam means for moving the cam means from said first cam position to said second cam position in response to movement of the actuator element in one direction, whereby the detent means is moved inwardly by the step means of the sleeve and the stem is moved in said one direction by said urging means causing the closure element to move from one of said first and second valve positions to the other.

5. A valve mechanism according to claim 4 in which said means connected to said actuator element and said cam means comprises a lost-motion mechanism permitting the actuator element to move in the direction opposite said one direction without moving said cam in said opposite direction when the stem means is in a position such that the internal surface of the sleeve prevents the detent means from projecting outwardly and thereby prevents the cam from moving in said opposite direction.

6. A valve mechanism according to claim 5 having a spring urging the cam means in said opposite direction whereby the cam means automatically causes the detent means to project outwardly when the stem means is moved to a position such that the detent means clears the step on the internal passage of the sleeve.

7. A valve mechanism according to claim 5 in which the actuator is a temperature responsive actuator, in which said stem means has a heat-conductive housing surrounding at least a substantial part of the actuator, and said stem means has a substantial external surface area in contact with the surface of the internal passage of the sleeve means, at least when the closure element is in said one of said first and second valve positions, whereby heat from a fluid in the valve body is conducted through the sleeve and the stem means to said heat-conductive housing.

8. A valve mechanism according to claim 4 in which the step on the internal surface of the sleeve is oblique with respect to said axis.

9. A valve mechanism comprising:
a valve body with at least two ports and a movable closure element arranged to control flow of a fluid from one of said ports to another of said ports, said closure element being movable along an axis between a first valve position in which flow from one of said ports to the other is shut off and a second valve position in which flow from one of said ports to the other is permitted;
an actuator comprising an actuator body and an actuator element movable in relation to said actuator body, the actuator being at a location remote from the fluid controlled by the valve mechanism;
means, secured to the valve body, providing a latching surface;
stem means slidable along said axis, the stem means being connected to the actuator body and to the closure element whereby the actuator body moves with the closure element;
latch means, carried by the stem means and engageable with the latching surface-providing means, for holding the valve element in one of said valve positions; and
means for urging the stem means in a direction to move the valve element toward the other of said valve positions;
said latch means being engaged with the movable actuator element and being responsive to a predetermined movement thereof in relation to the actuator body for disengagement with the latching surface, whereby said urging means can operate to move the valve element toward said other of said valve positions, and in which the actuator is a temperature-responsive actuator and in which said stem means has a heat-conductive housing surrounding at least a substantial part of the actuator, and said stem means includes means providing a heat-conductive path for conducting heat from fluid within the valve body to said heat-conductive housing.

10. A valve mechanism comprising:
a valve body with at least two ports and a movable closure element arranged to control flow of a fluid from one of said ports to another of said ports, said closure element being movable along an axis between a first valve position in which flow from one of said ports to the other is shut off and a second valve position in which flow from one of said ports to the other is permitted;
an actuator comprising an actuator body and an actuator element movable in relation to said actuator body;
means, secured to the valve body, providing a latching surface;
stem means slidable along said axis, the stem means being connected to the actuator body and to the closure element whereby the actuator body moves with the closure element;
latch means, carried by the stem means and engageable with the latching surface-providing means, for holding the valve element in one of said valve positions; and
means for urging the stem means in a direction to move the valve element toward the other of said valve positions;
said latch means being engaged with the movable actuator element and being responsive to a predetermined movement thereof in relation to the actuator body for disengagement with the latching surface, whereby said urging means can operate to move the valve element toward said other of said valve positions, and including:
sleeve means secured to the valve body, said sleeve means having an internal passage extending along said axis, and said passage having an internal surface;
and in which:
the actuator element is movable in relation to the actuator body along said axis;
the stem means extends through the sleeve means; and
the latch means comprises: an axial passage in the stem means, a plurality of radial passages in the stem means, each of said radial passages having a ball detent held therein against axial movement with respect to the stem means, and cam means, movable axially within the axial passage of the stem means, for urging the ball detents outwardly so that they protrude through their radial passages beyond the exterior of the stem means to positions in which they are capable of engaging the latching surface, the cam means being movable from a first cam position in which the ball detents protrude to a second position in which the ball detents can retract, and having a camming surface for urging the ball detents in their protruding direction;
the means providing a latching surface being a step on the internal surface of the sleeve, said step being cooperable with the ball detents to prevent movement of the stem means by the urging means in said direction along said axis, said step being of a shape such that movement of the stem means in said one direction causes the ball detents to move inwardly when inward movement is permitted by said cam means; and
means connected to said actuator element and said cam means for moving the cam means from said first cam position to said second cam position in response to movement of the actuator element in one direction, whereby the ball detents are moved inwardly by the step means of the sleeve and the stem is moved in said one direction by said urging means causing the closure element to move from one of said first and second valve positions to the other.

11. A valve mechanism according to claim 10 in which said means connected to said actuator element and said cam means comprises a lost-motion mechanism permitting the actuator element to move in the direction opposite said one direction without moving said cam in said opposite direction when the stem means is in a position such that the internal surface of the sleeve prevents the ball detents from projecting outwardly and thereby prevents the cam from moving in said opposite direction.

12. A valve mechanism according to claim 11 having a spring urging the cam means in said opposite direction whereby the cam means automatically causes the ball detents to project outwardly when the stem means is moved to a position such that the ball detents clear the step on the internal passage of the sleeve.

13. A valve mechanism according to claim 10 in which the actuator is a temperature responsive actuator, in which said stem means has a heat-conductive housing surrounding at least a substantial part of the actuator, and said stem means has a substantial external surface area in contact with the surface of the internal passage of the sleeve means, at least when the closure element is in said one of said first and second valve positions, whereby heat from a fluid in the valve body is conducted through the sleeve and the stem means to said heat-conductive housing.

14. A valve according to claim 10 in which the step on the internal surface of the sleeve is oblique with respect to said axis.

15. A valve mechanism comprising:
a valve body with at least two ports and a movable closure element arranged to control flow of a fluid from one of said ports to another of said ports, said closure element being movable along an axis between a first valve position in which flow from one of said ports to the other is shut off and a second position in which flow from one of said ports to the other is permitted;
an actuator having a body and an actuator element movable in relation to said actuator body;
neck means, secured to said valve body, having an internal passage extending along said axis, the actuator body being fixed to the neck means and the movable actuator element extending along said axis into the passage in the direction toward the valve element;
stem means connected to the valve element and extending into the passage in the direction toward the movable actuator element;
means for urging the stem means toward the actuator body whereby the valve element is urged toward said second valve position; and
means engaged by and responsive to the movable actuator element for moving the closure element toward its first valve position and for latching the closure element in said first valve position by latching the stem means to the neck means, as the movable actuator element moves in the direction toward the valve element, and permitting continued movement of the movable actuator element in the same direction beyond the position in which latching first takes place.

16. A valve mechanism according to claim 15 in which the actuator is a wax-filled thermal actuator, and including remotely controlled means for applying heat to the actuator body.

17. A valve mechanism according to claim 15 in which:
the internal passage of the neck means comprises small and larger coaxial cylindrical sections connected by an oblique annular step facing toward the valve element and toward said axis;
the stem means includes an exteriorly cylindrical cage extending along said axis and having ball detents arranged in a ring and held in radial openings therein against axial movement relative to the cage;
the cage also has a cylindrical internal passage with cam means axially movable therein, and spring means within the cage for urging the cam means toward the movable actuator element;
the cam means has an end surface engaged by the movable actuator element, and an oblique surface facing toward the valve element and engageable with the ball detents for urging the ball detents outwardly toward the wall of the larger cylindrical section of the internal passage of the neck means when the ball detents are in register with said larger cylindrical section;
and the smaller of the two cylindrical sections of the internal passage of the neck means has a size such that when the ball detents are in register with said smaller section, the oblique surface of the cam means cannot move past the ball detents in the direction toward the valve element;
whereby, upon movement of the movable actuator element toward the valve element, with the ball detents initially in engagement with the smaller of the coaxial cylindrical sections, the valve element is moved toward the first valve position by the movable actuator element acting through the cam means, the ball detents and the cage, and the ball detents project outwardly and engage the annular step to lock the valve element in said first position against the force of the urging means until the movable actuator element and cam means retract sufficiently to allow the ball detents to move inwardly and clear the step.

18. A valve mechanism according to claim 17 in which the cam means has a cylindrical surface located between said end surface and said oblique surface, said cylindrical surface being coaxial with said cylindrical sections of the internal passage of the neck means and having a diameter such that the space between the cylindrical surface of the cam means and the surface of the larger of said cylindrical sections is slightly larger than the diameter of each of the ball detents, whereby the cylindrical surface of the cam means holds the ball detents in their outwardly projecting position in engagement with the annular step while the movable actuator element continues to move beyond the position in which latching first takes place.

19. A valve for use in draining a liquid system to prevent the system from freezing under low ambient temperature conditions comprising:
means providing a valve chamber (12) connected to the liquid system, the valve chamber having a drain outlet (18);

a valve element (20) cooperating with the drain outlet and movable along an axis of movement from a first position in which it closes the drain outlet to a second position in which the drain outlet is opened;

a spring (34) connected to the valve element and to the valve chamber-providing means, and arranged to urge the valve element toward its second position;

sleeve means (56) secured to the valve body and having an internal passage extending along said axis and said passage having an internal surface (82);

a valve stem (52) connected to the valve element and extending along said axis through the sleeve means and slidable axially therein and terminating in a housing (64) external to the sleeve means (56) and remote from the valve element (20);

a thermally responsive wax actuator (58) having a body and an actuator element (60) movable in relation to the actuator body, the actuator including means for causing the actuator element to retract with respect to the actuator body as the temperature of the actuator body decreases through a predetermined temperature range, and the body of the actuator being rigidly connected to the valve stem (52) near the end thereof remote from the valve element (20), and being located within the housing (64);

the valve stem (52) having a cylindrical internal passage extending along said axis, and the actuator element (60) extending, from the actuator body, into the passage of the valve stem toward the valve element (20);

a cap (48) at the end of the valve stem nearest the valve element;

first coil spring means (94) within the internal passage of the valve stem having one end bearing against the cap (48);

a threaded stem (86) also located within the passage of the valve stem and extending axially therein, the threaded stem having a head (88) at the end thereof nearest the actuator (58);

a flange (90) threaded onto the threaded stem (86) and bearing against the end of the first coil spring means (94) remote from the cap;

the first coil spring means (94) being in compression between the cap (48) and the flange (90) and urging the flange (90) and threaded stem (86) in the direction such that the head (88) of the threaded stem bears against the end of the actuator element (60) remote from the actuator body;

cam means (76) surrounding and slidable along the threaded stem (86) between the head (88) thereof and the flange (90);

second coil spring means (92) within the passage of the valve stem, surrounding the threaded stem (86), and being in compression between the head (88) of the threaded stem and the cam means (76);

an array of radial passages in the valve stem (52) extending from the cylindrical internal passage thereof to the exterior thereof, each passage in the array being at the same axial position along the length of the valve stem as each of the other passages in the array;

a ball (70, 72) located in each of said radial passages and held thereby against axial movement but radially movable therein;

the valve stem having a cylindrical outer surface extending axially from a location on one side of the array of radial passages to a location on the opposite side of the array;

the internal surface (82) of the sleeve means (56) comprising a first cylindrical section having a diameter such as to allow sliding clearance for the cylindrical outer surface of the valve stem, a second cylindrical section coaxial with, but larger in diameter than, the first cylindrical section and located between the first cylindrical section and the valve element, and a latching step (84) connecting the first and second cylindrical sections;

the cam means comprising an oblique, frusto-conical surface (78) facing outwardly and toward the valve element (20); and the cam means (76) also comprising a cylindrical outer surface (80), located between the frusto-conical surface (78) and the flange (90), the diameter of the second cylindrical outer surface being such as to allow clearance for the balls (70, 72) when the radial passages are in register with the first cylindrical section of the internal surface of the sleeve;

the oblique, frusto-conical surface (78) of the cam (76) serving to urge the balls (70, 72) outwardly and into engagement with the latching step (84) when the valve stem (52) is positioned so that its radial passages are clear of the first cylindrical surface of the sleeve means (56) and the flange (90) on the threaded stem (86) is in a position such as to allow the oblique frusto-conical surface (78) of the cam (76) to move into engagement with the balls (70, 72);

the latching step (84) being of a size and shape such that the balls are urged radially inwardly when retraction of the actuator element (60) allows the first coil spring means (94) to move the cam (76) to a position in which its frusto-conical surface (78) permits radial inward movement of the balls; and the sliding relationship of the cam (76) and the threaded stem (86) allowing the actuator element (68) to move toward the valve element as the temperature of the actuator body increases, when the balls (70, 72) are in engagement with the first cylindrical section of the internal surface (82) of the sleeve means (56) and project inwardly into engagement with the frusto-conical surface (78) of the cam (76), thereby preventing the cam from moving toward the valve element.

20. A valve according to claim 19 in which the latching step (84) is an oblique, frusto-conical latching step facing both inwardly and toward the valve element (20).

21. A valve according to claim 19 in which the sleeve means (56) is in heat-conductive relationship to the valve chamber (12), in which the housing (64) is in heat-conductive relationship with the valve stem, and in which the cylindrical outer surface of the valve stem (52) is in heat-conductive contact with the internal surface of the sleeve means (56) over a sufficient area, at least when the valve element (20) is in said first position, in which the drain outlet (18) is closed, that heat is conducted from the liquid system through the valve chamber (12), sleeve means (56) and valve stem (52) to the housing (64) at a rate sufficient to prevent the actuator (58) from causing release of the valve element (20) when the liquid in the liquid system is warm.

22. A valve for use in draining a liquid system to prevent the system from freezing under low ambient temperature conditions comprising:
- means providing a valve chamber (12) connected to the liquid system, the valve chamber having a drain outlet (18);
- a valve element (20) cooperating with the drain outlet and movable along an axis of movement from a first position in which it closes the drain outlet to a second position in which the drain outlet is opened;
- a spring (34) connected to the valve element and to the valve chamber-providing means, and arranged to urge the valve element toward its second position;
- sleeve means (56) secured to the valve body and having an internal passage extending along said axis and said passage having an internal surface (82);
- a valve stem (52) connected to the valve element and extending along said axis through the sleeve means and slidable axially therein and terminating in a housing (64) external to the sleeve means (56) and remote from the valve element (20);
- a thermally responsive wax actuator (58) having a body and an actuator element (60) movable in relation to the actuator body, the actuator including means for causing the actuator element to retract with respect to the actuator body as the temperature of the actuator body decreases through a predetermined temperature range, and the body of the actuator being rigidly connected to the valve stem (52) near the end thereof remote from the valve element (20), and being located within the housing (64);
- the valve stem (52) having a cylindrical internal passage extending along said axis, and the actuator element (60) extending, from the actuator body, into the passage of the valve stem toward the valve element (20);
- a cap (48) at the end of the valve stem nearest the valve element;
- first coil spring means (94) within the internal passage of the valve stem having one end bearing against the cap (48);
- a threaded stem (86) also located within the passage of the valve stem and extending radially therein, the threaded stem having a head (88) at the end thereof nearest the actuator (58);
- a flange (90) threaded onto the threaded stem (86) and bearing against the end of the first coil spring means (94) remote from the cap;
- the first coil spring means (94) being in compression between the cap (48) and the flange (90) and urging the flange (90) and threaded stem (86) in the direction such that the head (88) of the threaded stem bears against the end of the actuator element (60) remote from the actuator body;
- cam means (76) surrounding and slidable along the threaded stem (86) between the head (88) thereof and the flange (90);
- second coil spring means (92) within the passage of the valve stem, surrounding the threaded stem (86), and being in compression between the head (88) of the threaded stem and the cam means (76);
- an array of radial passages in the valve stem (52) extending from the cylindrical internal passage thereof to the exterior thereof, each passage in the array being at the same axial position along the length of the valve stem as each of the other passages in the array;
- a ball (70, 72) located in each of said radial passages and held thereby against axial movement but radially movable therein;
- the valve stem having a cylindrical outer surface extending axially from a location on one side of the array of radial passages to a location on the opposite side of the array;
- the internal surface (82) of the sleeve means (56) comprising a first cylindrical section having a diameter such as to allow sliding clearance for the cylindrical outer surface of the valve stem, a second cylindrical section coaxial with, but larger in diameter than, the first cylindrical section and located between the first cylindrical section and the valve element, and a latching step (84) connecting the first and second cylindrical sections;
- the cam means (76) comprising a first cylindrical outer surface (74) having a diameter such that, when the first cylindrical outer surface is in register with the radial passages, the balls (70, 72) must project outwardly therefrom beyond the radial extent of the first cylindrical section of the internal surface of the sleeve;
- the cam means (76) also comprising a second cylindrical outer surface (80), located between the first cylindrical outer surface (74) and the flange (90), the diameter of the second cylindrical outer surface being smaller than that of the first cylindrical outer surface such as to allow clearance for the balls (70, 72) when the radial passages are in register with the first cylindrical section of the internal surface of the sleeve;
- the cam means also comprising an oblique, outwardy facing frusto-conical surface (78) connecting its first and second cylindrical outer surfaces;
- the oblique, frusto-conical surface (78) of the cam (76) serving to urge the balls (70, 72) outwardly and into engagement with the frusto-conical latching step when the valve stem (52) is positioned so that its radial passages are clear of the first cylindrical surface of the sleeve means (56) and the flange (90) on the threaded stem (86) is in a position such as to allow the oblique frusto-conical surface (78) of the cam (76) to move into engagement with the balls (70, 72);
- the first cylindrical outer surface (74) of the cam (76) serving to hold the balls in their projecting position and in engagement with the latching step as the cam moves axially toward the valve element (22) from the position in which it first urges the balls (70, 72) outwardly;
- the latching step (84) being of a size and shape such that the balls are urged radially inwardly when retraction of the actuator element (60) allows the first coil spring means to move the cam (76) to a position in which its first cylindrical outer surface clears the radial passages of the valve stem (52), and the frusto-conical surface (78) of the cam permits radial inward movement of the balls; and
- the sliding relationship of the cam (76) and the threaded stem (86) allowing the actuator element (68) to move toward the valve element as the temperature of the actuator body increases, when the balls (70, 72) are in engagement with the first cylindrical section of the internal surface (82) of the sleeve means (56) and project inwardly into engagement with the frusto-conical surface (78) of the cam (76), thereby preventing the cam from moving toward the valve element.

23. A valve according to claim 22 in which the latching step (84) is an oblique, frusto-conical latching step facing both inwardly and toward the valve element (20).

24. A valve according to claim 22 in which the sleeve means (56) is in heat-conductive relationship to the valve chamber (12), in which the housing (64) is in heat-conductive relationship with the valve stem, and in which the cylindrical outer surface of the valve stem (52) is in heat-conductive contact with the internal surface of the sleeve means (56) over a sufficient area, at least when the valve element (20) is in said first position, in which the drain outlet (18) is closed, that heat is conducted from the liquid system through the valve chamber (12), sleeve means (56) and valve stem (52) to the housing (64) at a rate sufficient to prevent the actuator (58) from causing release of the valve element (20) when the liquid in the liquid system is warm.

25. In a fluid system a valve comprising a valve body with at least two ports, and a movable closure element arranged to control flow of fluid from one of said ports to another of said ports, said closure element being movable along an axis between a first valve position in which flow from one of said ports to the other is shut off and a second position in which flow from one of said ports to the other is permitted, wherein one of the ports is exposed to fluid under high pressure, and the movable closure element is arranged so that the high pressure of the fluid tends to urge the closure element toward its second position when the closure element is in its first position;

a wax-filled thermal actuator connected to the valve body and having an actuator element movable in relation to the valve body with changes in the temperature of the actuator;

means connected between the movable actuator element and the closure element for effecting movement of the closure element toward its first valve position in response to the force imparted to it by the actuator element moving in a first direction upon the application of heat thereto;

latching means responsive to the movable actuator element for holding the closure element in its first valve position when the movable actuator element, moving in said first direction, reaches an initial closing position in which the closure element first reaches said first valve position, and permitting further movement of the movable actuator element in the same direction upon continued application of heat, the latching means holding the closure element in said first valve position and at the same time relieving the actuator from withstanding the high pressure of the fluid which urges the closure element toward its second position, until the movable actuator element returns to said initial closing position.

26. A fluid system according to claim 25 including remotely controlled means for supplying heat to the actuator.

27. A fluid system according to claim 25 including neck means secured to the valve body and having an internal passage along an axis extending from the actuator toward the valve element, the actuator body being fixed to the neck means and the movable actuator element extending into said internal passage toward the valve element, and stem means connected to the valve element and extending into said internal passage toward the movable actuator element;

the internal passage of the neck means comprising small and larger coaxial cylindrical sections connected by an oblique annular step facing toward the valve element and toward said axis;

the stem means including an exteriorly cylindrical cage extending along said axis and having ball detents arranged in a ring and held in radial openings therein against axial movement relative to the cage;

the cage also having a cylindrical internal passage with cam means axially movable therein, and spring means within the cage for urging the cam means toward the movable actuator element;

the cam means having an end surface engaged by the movable actuator element, and an oblique surface facing toward the valve element an engageable with the ball detents for urging the ball detents outwardly toward the wall of the larger cylindrical section of the internal passage of the neck means when the ball detents are in register with said larger cylindrical section;

and the smaller of the two cylindrical sections of the internal passage of the neck means having a size such that when the ball detents are in register with said smaller section, the oblique surface of the cam means cannot move past the ball detents in the direction toward the valve element;

whereby, upon movement of the movable actuator element toward the valve element, with the ball detents initially in engagement with the smaller of the coaxial cylindrical sections, the valve element is moved toward the first valve position by the movable actuator element acting through the cam means, the ball detents and the cage, and the ball detents project outwardly and engage the annular step to lock the valve element in said first position against the force of the urging means until the movable actuator element and cam means retract sufficiently to allow the ball detents to move inwardly and clear the step.

28. A valve mechanism according to claim 27 in which the cam means has a cylindrical surface located between said end surface and said oblique surface, said cylindrical surface being coaxial with said cylindrical sections of the internal passage of the neck means and having a diameter such that the space between the cylindrical surface of the cam means and the surface of the larger of said cylindrical sections is slightly larger than the diameter of each of the ball detents, whereby the cylindrical surface of the cam means holds the ball detents in their outwardly projecting position in engagement with the annular step while the movable actuator element continues to move beyond the position in which latching first takes place.

29. A valve mechanism comprising:

a valve body with at least two ports and a movable closure element arranged to control flow of a fluid from one of said ports to another of said ports, said closure element being movable along an axis between a first valve position in which flow from one of said ports to the other is shut off and a second valve position in which flow from one of said ports to the other is permitted;

a valve stem connected to the closure element;

a temperature-responsive actuator comprising an actuator body carried by the valve stem and an actuator element movable in relation to the actuator body;

means for continuously urging the closure element toward the second valve position when the closure element is in the first valve position;

latch means, for latching the closure element in the first valve position, the latch means comprising a cam carried by the valve stem and connected to the movable actuator element by first spring means, a detent surface fixed to the valve body, and detent means carried by the stem and movable by the cam from a latching position, in which the detent means engages the detent surface and holds the closure element in the first valve position, to an unlatched position in which the urging means is permitted to cause movement of the closure element to the second valve position;

means fixed to the valve body and providing a surface engaging the movable detent means when the closure element is in the second valve position, and holding the movable detent means in a position to prevent movement of the cam in a direction to push the movable detent means toward engagement with the latching surface when the closure element is in the second valve position;

second spring means connected to the cam for urging the cam in a direction opposite to the last-mentioned direction; and means connected between the cam and the movable actuator element for limiting the extent to which the first spring means can deform upon movement of the movable actuator element in the direction to unlatch the latch means, and causing the deformation limit to be reached before the latch means unlatches.

* * * * *

UNITED STATES PATENT AND TRADEMARK OFFICE
CERTIFICATE OF CORRECTION

PATENT NO. : 4,460,007
DATED : July 17, 1984
INVENTOR(S) : Fred L. Pirkle

It is certified that error appears in the above-identified patent and that said Letters Patent are hereby corrected as shown below:

Column 3, line 61, "oject" should be --object--;

Column 4, line 65, "surround" should be --surrounds--;

Column 10, line 33, "cmprises" should be --comprises--;

Column 11, line 13, "5" should be --4--;

Column 17, line 46, "radially" should be --axially--.

Signed and Sealed this

*Eleventh* Day of *December 1984*

[SEAL]

*Attest:*

*Attesting Officer*

GERALD J. MOSSINGHOFF

*Commissioner of Patents and Trademarks*